(12) United States Patent
Lu et al.

(10) Patent No.: US 10,659,350 B2
(45) Date of Patent: May 19, 2020

(54) DATA ROUTING METHOD AND APPARATUS

(71) Applicant: HUAWEI TECHNOLOGIES CO., LTD., Shenzhen, Guangdong (CN)

(72) Inventors: Wei Lu, Shanghai (CN); Chunshan Xiong, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/940,080

(22) Filed: Mar. 29, 2018

(65) Prior Publication Data

US 2018/0227226 A1 Aug. 9, 2018

Related U.S. Application Data

(63) Continuation of application No. PCT/CN2015/091327, filed on Sep. 30, 2015.

(51) Int. Cl.
*H04L 12/721* (2013.01)
*H04L 12/715* (2013.01)
*H04L 12/851* (2013.01)

(52) U.S. Cl.
CPC .............. *H04L 45/38* (2013.01); *H04L 45/64* (2013.01); *H04L 47/2483* (2013.01)

(58) Field of Classification Search
None
See application file for complete search history.

(56) References Cited

U.S. PATENT DOCUMENTS

| 2014/0334488 | A1* | 11/2014 | Guichard | H04L 45/306 370/392 |
| 2015/0195197 | A1 | 7/2015 | Yong et al. | |
| 2015/0215172 | A1 | 7/2015 | Kumar et al. | |
| 2016/0323193 | A1 | 11/2016 | Zhou et al. | |

(Continued)

FOREIGN PATENT DOCUMENTS

| CN | 103929492 A | 7/2014 |
| CN | 104079482 A | 10/2014 |

(Continued)

OTHER PUBLICATIONS

International Search Report, dated Jun. 8, 2016, in International Application No. PCT/CN2015/091327 (4 pp.).

(Continued)

*Primary Examiner* — Lonnie V Sweet
(74) *Attorney, Agent, or Firm* — Staas & Halsey LLP

(57) ABSTRACT

A data routing method and apparatus resolve a problem that data packet forwarding efficiency is greatly reduced because a service function instance sequence needs to be retrieved for each data packet according to a 5-tuple of a data flow to which the data packet belongs. The data routing method includes: receiving, by a traffic classifier, a data packet, where the data packet belongs to a first data flow; allocating, by the traffic classifier, a first data route identifier to the first data flow, where the first data route identifier is used to identify a service function chain of the first data flow and is used to identify the first data flow; adding, by the traffic classifier, the first data route identifier to the data packet; and sending, by the traffic classifier, the data packet to a service function forwarding device.

6 Claims, 8 Drawing Sheets

(56) References Cited

U.S. PATENT DOCUMENTS

| | | | |
|---|---|---|---|
| 2017/0005920 A1* | 1/2017 | Previdi | H04L 45/306 |
| 2017/0048148 A1 | 2/2017 | Huang et al. | |
| 2018/0198705 A1* | 7/2018 | Wang | H04L 45/306 |
| 2018/0241680 A1* | 8/2018 | Larose | H04L 41/5012 |
| 2019/0140863 A1* | 5/2019 | Nainar | H04L 45/38 |

FOREIGN PATENT DOCUMENTS

| | | |
|---|---|---|
| CN | 104639414 A | 5/2015 |
| EP | 3082304 A1 | 10/2016 |
| WO | 2015085470 A1 | 6/2015 |
| WO | 2015100530 A1 | 7/2015 |

OTHER PUBLICATIONS

Halpern, J. et al., "Service Function Chaining (SFC) Architecture," Network Working Group, Internet-Draft, Jul. 24, 2015, XP015124064, pp. 1-30.

Ma, K. et al., "SFC Service Decomposition," Network Working Group, Internet-Draft, Aug. 11, 2014, XP015101141, (14 pp.).

Extended European Search Report, dated Jul. 20, 2018, in European Application No. 15905114.3 (9 pp.).

International Search Report dated Jun. 8, 2016 in corresponding International Patent Application No. PCT/CN2015/091327.

Chinese Office Action for Chinese Application No. 201580072122.4 dated Apr. 28, 2019.

* cited by examiner

DATA ROUTING METHOD AND APPARATUS

CROSS-REFERENCE TO RELATED APPLICATIONS

This application is a continuation of International Application No. PCT/CN2015/091327 filed on Sep. 30, 2015, the disclosure of which is hereby incorporated by reference in its entirety.

TECHNICAL FIELD

The present disclosure relates to the field of communications technologies, and in particular, to a data routing method and apparatus.

BACKGROUND

In a fixed or mobile broadband access field and data center application, there are many value-added service devices based on a transport layer to an application layer, for example, a device with a service function (SF) such as antivirus, a firewall, application caching and acceleration, web (web) optimization, network address translation (NAT), or home control. FIG. 1 is a schematic diagram of devices with service functions that are connected in series. A user access device may be a gateway general packet radio system (GPRS) support node (GGSN) or a packet data network gateway (PGW) of mobile broadband, or a broadband network gateway (BNG) of fixed broadband. As shown in FIG. 1, the user access device is connected to a Gi-LAN (local area network) by using a Gi interface. In actual application, a user only needs to use some of the service functions, for example, some users subscribe to a service function of antivirus, and some users need to use a service function of NAT. In a serial networking manner, all data flows need to pass through devices with service functions that are connected in series, and consequently, a requirement for a processing capacity of the device with the service function is increased, and unnecessary network device investments are increased. In addition, in the serial networking manner, a fault of one of the devices with the service functions causes interruption and faults of an entire data flow.

To resolve a problem that exists when the devices with the service functions are connected in series, a concept of a service function chain (which is also referred to as a service chain) is proposed. The service function chain is service functions through which a data flow needs to pass and an order of passing through the service functions. For example, antivirus, a firewall, and NAT may be a service function chain, or application caching and acceleration, a firewall, and NAT may be a service function chain, or a firewall and NAT may be a service function chain. Data flows corresponding to different service function chains need to pass through only corresponding service functions.

FIG. 2 is a schematic diagram of a network architecture based on a service function chain. As shown in FIG. 2, the network architecture includes a control plane device, a traffic classifier (TC), a service function forwarding (SFF) device, and service functions such as an SF 1, an SF 2, an SF 3, and an SF 4. A data flow may need to pass through only some service functions, for example, pass through only an SF 1, an SF 3, and an SF 4. The traffic classifier may also be referred to as a classifier. In consideration of load balance and security, multiple devices are usually deployed for a same service function. For example, three devices are deployed for each service function, and a device deployed for each service function is referred to as a service function instance, for example, an SF 1.1.

In the network architecture shown in FIG. 2, the control plane device allocates a service function chain identifier to a data flow, and informs the traffic classifier of the service function chain identifier. The service function chain identifier is used to identify a service function chain corresponding to the data flow. After adding the service function chain identifier to the data flow, the traffic classifier sends the data flow to the service function forwarding device in a Gi-LAN. The service function forwarding device routes the data flow according to the service function chain identifier in the data flow. In a process of routing the data flow, the service function forwarding device needs to select a service function instance from multiple service function instances corresponding to service functions that form a service function chain. Service function instances selected from the service functions form a service function instance sequence of the data flow. According to a data flow processing requirement, all data packets of a same data flow need to pass through a same service function instance sequence. In addition, when a service function chain of an uplink data flow and a service function chain of a corresponding downlink data flow include a same service function, a same service function instance needs to be selected when the uplink data flow and the downlink data flow pass through the same service function.

In the prior art, each time the service function forwarding device receives a data packet, the service function forwarding device needs to retrieve a service function instance sequence of the data packet according to a 5-tuple of the data packet. Consequently, data packet forwarding efficiency is greatly reduced.

SUMMARY

Embodiments of the present invention provide a data routing method and apparatus, to resolve a problem that data packet forwarding efficiency is greatly reduced because a service function instance sequence needs to be retrieved for each data packet according to a 5-tuple of a data flow to which the data packet belongs.

Specific technical solutions provided in the embodiments of the present invention are as follows:

According to a first aspect, an embodiment of the present invention provides a data routing method, including:

receiving, by a traffic classifier, a data packet, where the data packet belongs to a first data flow;

allocating, by the traffic classifier, a first data route identifier to the first data flow, where the first data route identifier is used to identify a service function chain of the first data flow and is used to identify the first data flow;

adding, by the traffic classifier, the first data route identifier to the data packet; and sending, by the traffic classifier, the data packet to a service function forwarding device.

According to a second aspect, an embodiment of the present invention provides a data routing method, including:

receiving, by a service function forwarding device, a data packet, where the data packet includes a first data route identifier of a first data flow to which the data packet belongs, and the first data route identifier is used to identify a service function chain of the first data flow and is used to identify the first data flow;

determining, by the service function forwarding device, the service function chain of the first data flow according to the first data route identifier, and determining a service function instance sequence of the first data flow according to the service function chain; and forwarding, by the service function forwarding device, the data packet according to the service function instance sequence.

According to a third aspect, an embodiment of the present invention provides a data routing method, including:

determining, by a control plane device, a first data route identifier of a first data flow, where the first data route identifier is used to identify a service function chain of the first data flow and is used to identify the first data flow; and sending, by the control plane device, a correspondence between the first data flow and the first data route identifier to a traffic classifier.

According to a fourth aspect, an embodiment of the present invention provides a data routing apparatus, including a processor and a network interface, where the network interface is configured to receive a data packet, and the data packet belongs to a first data flow; the processor is configured to: allocate a first data route identifier to the first data flow, where the first data route identifier is used to identify a service function chain of the first data flow and is used to identify the first data flow; and add the first data route identifier to the data packet; and the network interface is further configured to send the data packet to a service function forwarding device.

According to a fifth aspect, an embodiment of the present invention provides a data routing apparatus, including a processor and a network interface, where the network interface is configured to receive a data packet, the data packet includes a first data route identifier of a first data flow to which the data packet belongs, and the first data route identifier is used to identify a service function chain of the first data flow and is used to identify the first data flow; the processor is configured to: determine the service function chain of the first data flow according to the first data route identifier, and determine a service function instance sequence of the first data flow according to the service function chain; and the network interface is further configured to forward the data packet according to the service function instance sequence.

According to a sixth aspect, an embodiment of the present invention provides a data routing apparatus, including a processor and a network interface, where the processor is configured to determine a first data route identifier of a first data flow, and the first data route identifier is used to identify a service function chain of the first data flow and is used to identify the first data flow; and the network interface is configured to send a correspondence between the first data flow and the first data route identifier to a traffic classifier.

According to a seventh aspect, an embodiment of the present invention provides a data routing apparatus, including: a receiving unit, configured to receive a data packet, where the data packet belongs to a first data flow; a processing unit, configured to: allocate a first data route identifier to the first data flow, where the first data route identifier is used to identify a service function chain of the first data flow and is used to identify the first data flow; and add the first data route identifier to the data packet; and a sending unit, configured to send the data packet to a service function forwarding device.

According to an eighth aspect, an embodiment of the present invention provides a data routing apparatus, including a receiving unit, configured to receive a data packet, where the data packet includes a first data route identifier of a first data flow to which the data packet belongs, and the first data route identifier is used to identify a service function chain of the first data flow and is used to identify the first data flow; a processing unit, configured to: determine the service function chain of the first data flow according to the first data route identifier, and determine a service function instance sequence of the first data flow according to the service function chain; and a sending unit, configured to forward the data packet according to the service function instance sequence.

According to a ninth aspect, an embodiment of the present invention provides a data routing apparatus, including a processing unit, configured to determine a first data route identifier of a first data flow, where the first data route identifier is used to identify a service function chain of the first data flow and is used to identify the first data flow; and a sending unit, configured to send a correspondence between the first data flow and the first data route identifier to a traffic classifier.

Based on the foregoing technical solutions, in the embodiments of the present invention, the traffic classifier adds, to a data packet, a data route identifier of a data flow to which the data packet belongs, the data route identifier is used to identify a service function chain of the data flow and is used to identify the data flow, and after receiving the data packet, the service function forwarding device can determine a service function instance sequence according to the data route identifier in the data packet. Therefore, matching is not performed by using a 5-tuple, and data packet forwarding efficiency is improved.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

To make the objectives, technical solutions, and advantages of the present invention clearer, the following further describes the present invention in detail with reference to the accompanying drawings. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

An application scenario of the embodiments of the present invention may be a network including a control plane device, one or more traffic classifiers, a service function forwarding device, and service function instances corresponding to service functions, but is not limited thereto.

In the embodiments of the present invention, the traffic classifier may be an independent device, or may be integrated into a network device such as a PGW, a policy and charging rules function (PCRF) entity, or a traffic detection function (TDF) entity.

Figure 1:
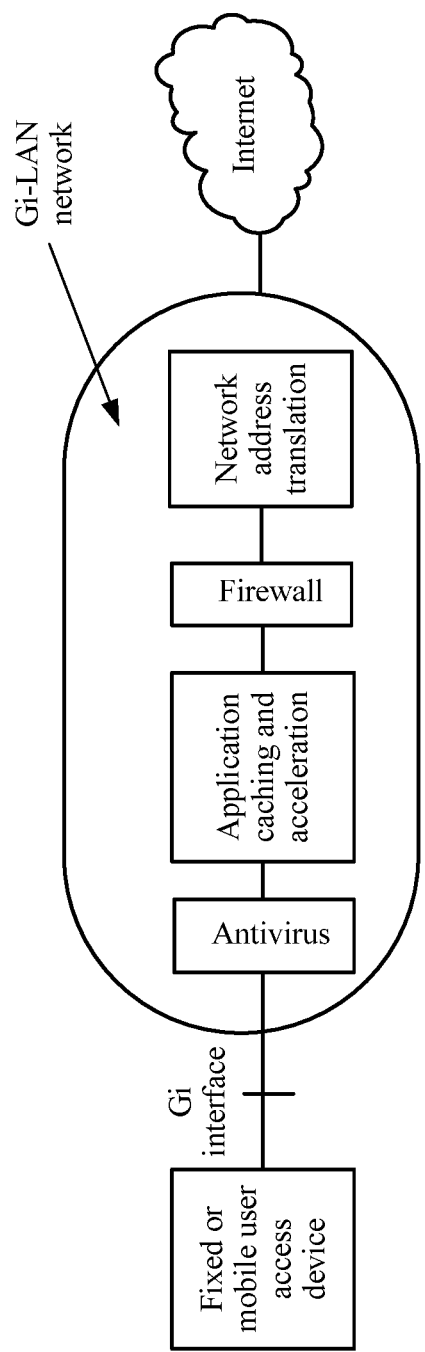
FIG. 1 is a schematic diagram of devices with service functions that are connected in series.
Figure 2:
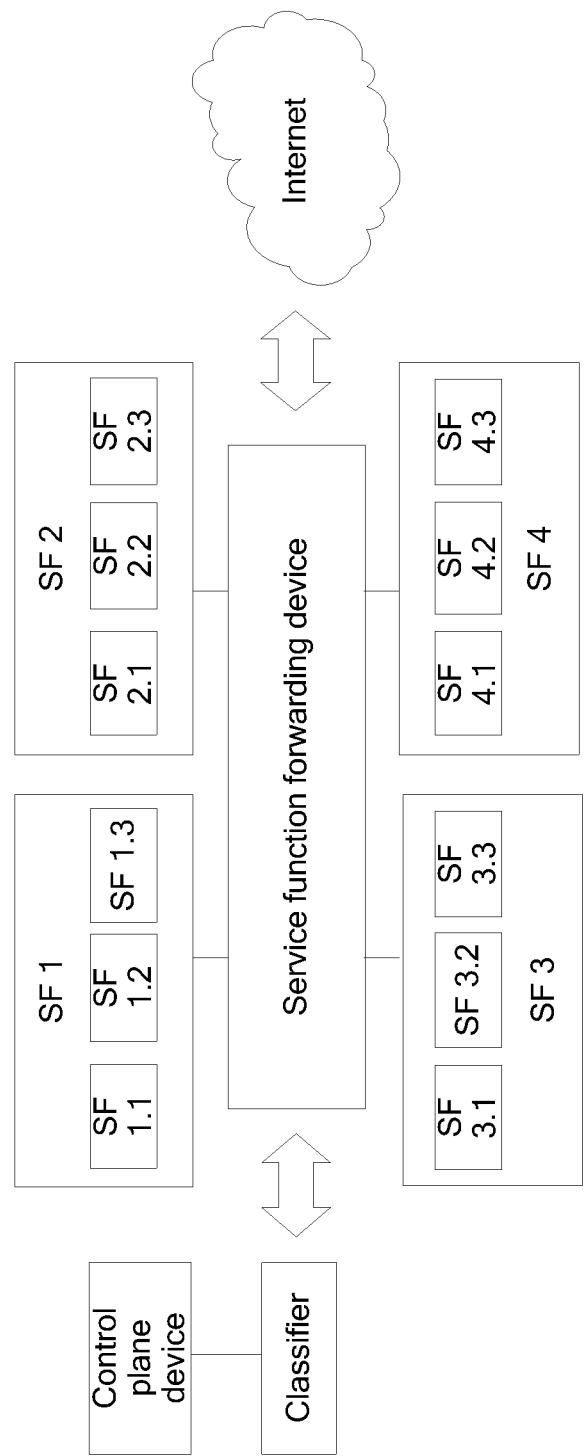
FIG. 2 is a schematic diagram of a network architecture based on a service function chain.
Figure 3:
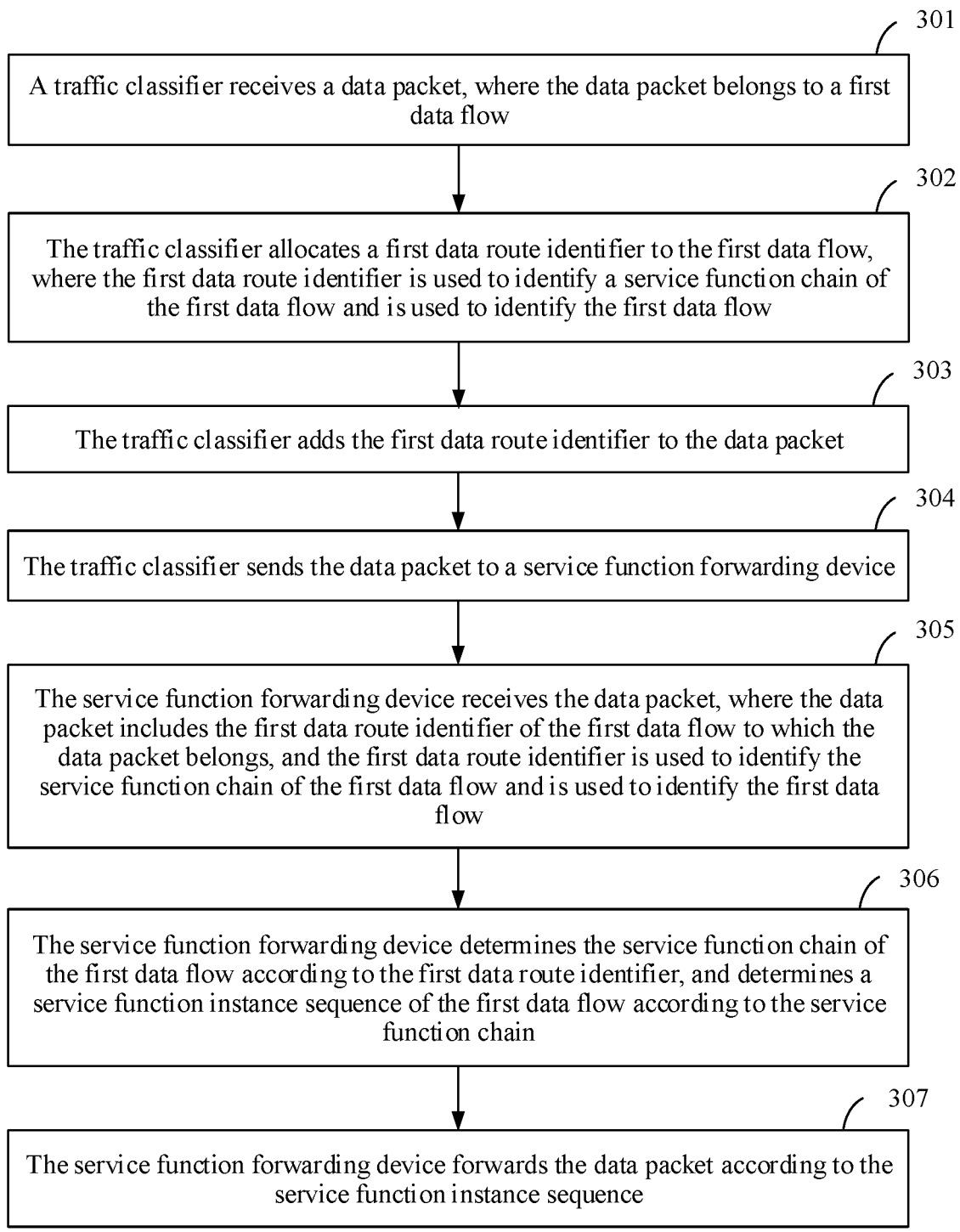
FIG. 3 is a flowchart of a data routing method according to a first embodiment of the present invention.

FIG. 3 is a flowchart of a data routing method according to a first embodiment of the present invention. As shown in FIG. 3, the method in this embodiment includes the following.

301. A traffic classifier receives a data packet, where the data packet belongs to a first data flow.

302. The traffic classifier allocates a first data route identifier to the first data flow, where the first data route identifier is used to identify a service function chain of the first data flow and is used to identify the first data flow.

Optionally, manners in which the traffic classifier allocates the first data route identifier to the first data flow include but are not limited to the following several implementations.

Manner 1: The data packet received by the traffic classifier includes the first service function chain identifier of the first data flow, and the first service function chain identifier is used to identify the service function chain of the first data flow. Optionally, the first service function chain identifier may include identifiers of service functions in the service function chain of the first data flow, or may include character string information of service functions in the service function chain of the first data flow. An implementation form of the first service function chain is not limited provided that a service function chain can be uniquely determined. The traffic classifier obtains a correspondence between the first service function chain identifier and multiple data route identifiers. For example, the traffic classifier receives a policy and charging control (PCC) rule or an application detection and control (ADC) rule delivered by a control plane device, and the delivered rule includes the correspondence between the first service function chain identifier and the multiple data route identifiers. The traffic classifier allocates the first data route identifier to the first data flow from the multiple data route identifiers according to the correspondence between the first service function chain identifier and the multiple data route identifiers, and the allocated first data route identifier is a data route identifier in the multiple data route identifiers that is not allocated to another data flow.

Manner 2: The traffic classifier allocates the first data route identifier to the first data flow according to a correspondence between the first data flow and the first data route identifier, and the correspondence between the first data flow and the first data route identifier is sent by a control plane device to the traffic classifier.

Manner 3: The traffic classifier randomly allocates the first data route identifier to the first data flow.

Optionally, in Manner 1 and Manner 3, after allocating the first data route identifier to the first data flow, the traffic classifier establishes the correspondence between the first data flow and the first data route identifier, so as to directly query the correspondence after subsequently receiving the data packet that belongs to the first data flow. For example, the traffic classifier establishes a correspondence between a 5-tuple of the first data flow and the first data route identifier.

303. The traffic classifier adds the first data route identifier to the data packet.

304. The traffic classifier sends the data packet to a service function forwarding device.

Optionally, before sending the data packet to the service function forwarding device, the traffic classifier further determines a second data route identifier of a second data flow. The second data flow is a data flow in a direction opposite to the first data flow, and the second data route identifier is used to identify a service function chain of the second data flow and is used to identify the second data flow. The traffic classifier not only adds the first data route identifier to the data packet, but also adds indication information to the data packet, and the indication information is used to indicate the second data route identifier.

Optionally, manners in which the traffic classifier determines the second data route identifier of the second data flow include but are not limited to the following two implementations.

Manner 1: The traffic classifier determines a second service function chain identifier of the second data flow, and allocates the second data route identifier to the second data flow according to the second service function chain identifier. The second service function chain identifier is used to identify the service function chain of the second data flow.

Manner 2: The traffic classifier determines the second data route identifier according to a correspondence between the second data flow and the second data route identifier. The second data route identifier is allocated to the second data flow when the traffic classifier receives the second data flow.

Optionally, the traffic classifier searches a stored correspondence between a data flow and a data route identifier. If there is the second data route identifier of the second data flow in the correspondence, the traffic classifier directly obtains the second data route identifier of the second data flow from the correspondence. If there is no second data route identifier of the second data flow in the correspondence, the traffic classifier allocates the second data route identifier to the second data flow according to the second service function chain identifier of the second data flow, and saves the correspondence between the second data flow and the second data route identifier. A process in which the traffic classifier allocates the second data route identifier to the second data flow according to the second service function chain identifier of the second data flow is similar to a process in which the traffic classifier allocates the first data route identifier to the first data flow according to the first service function chain identifier of the first data flow. For details, refer to detailed descriptions in 302. The details are not described herein again.

305. The service function forwarding device receives the data packet, where the data packet includes the first data route identifier of the first data flow to which the data packet belongs, and the first data route identifier is used to identify the service function chain of the first data flow and is used to identify the first data flow.

306. The service function forwarding device determines the service function chain of the first data flow according to the first data route identifier, and determines a service function instance sequence of the first data flow according to the service function chain.

Optionally, the service function forwarding device locally stores a correspondence among the first service function chain identifier, the first data route identifier, and the service function chain. The correspondence may be configured by the control plane device for the service function forwarding device, or may be forwarded by another function device to the service function forwarding device.

Optionally, the service function forwarding device determines a service function chain identified by the first data route identifier, and sequentially selects corresponding service function instances for service functions in the service function chain according to a function of identifying the first data flow by the first data route identifier and according to order of the service functions in the service function chain. The selected service function instances form the service function instance sequence of the first data flow.

Optionally, the service function forwarding device further stores a correspondence between the first data route identifier and the service function instance sequence of the first data flow, to directly search, after subsequently receiving the data packet that belongs to the first data flow, the correspondence according to the first data route identifier carried in the data packet, and obtains a service function instance sequence corresponding to the first data route identifier. In this way, a corresponding service function instance sequence is not retrieved according to a 5-tuple in the data packet each time, and data forwarding efficiency is improved.

Optionally, the data packet further includes indication information, the indication information is used to indicate the second data route identifier of the second data flow, the second data flow is the data flow in the direction opposite to the first data flow, and the second data route identifier is used to identify the service function chain of the second data flow and is used to identify the second data flow.

Optionally, the service function forwarding device further determines the second data route identifier according to the indication information included in the data packet, and determines the service function chain of the second data flow according to the second data route identifier. The service function forwarding device further determines a service function instance sequence of the second data flow according to the service function chain of the second data flow, and when the service function chain of the second data flow and the service function chain of the first data flow include a same service function, the service function forwarding device selects a same service function instance for the same service function. That is, in a process of selecting service function instances for service functions in the service function chain of the first data flow, for a service function included in both the service function chain of the first data flow and the service function chain of the second data flow, the service function forwarding device selects a same service function instance as a service function instance of a same service function of the second data flow, to avoid routing interruption of the data flow.

307. The service function forwarding device forwards the data packet according to the service function instance sequence.

In this embodiment, the traffic classifier allocates the first data route identifier to the first data flow, and adds the first data route identifier to the data packet, and the first data route identifier is used to identify the service function chain of the first data flow and is used to identify the first data flow. The service function forwarding device receives the data packet forwarded by the traffic classifier, and determines the service function instance sequence of the first data flow according to the first data route identifier carried in the data packet. Therefore, a service function instance sequence does not need to be retrieved by using a 5-tuple each time a data packet is received, so that data packet forwarding efficiency is improved.

Further, in this embodiment, the traffic classifier adds the indication information of the second data route identifier of the second data flow to the data packet, and the second data flow is the data flow in the direction opposite to the first data flow to which the data packet belongs. The service function forwarding device determines the service function instance sequence of the second data flow according to the data route identifier that is of the second data flow and that is carried in the data packet. Therefore, when determining the service function instance sequence of the first data flow, the service function forwarding device may directly refer to the service function instance sequence of the second data flow, so that a process of determining a 5-tuple of the second data flow according to a 5-tuple of the first data flow and then matching the service function instance sequence of the second data flow by using the 5-tuple of the second data flow is avoided, and the data forwarding efficiency is further improved.

Figure 4:
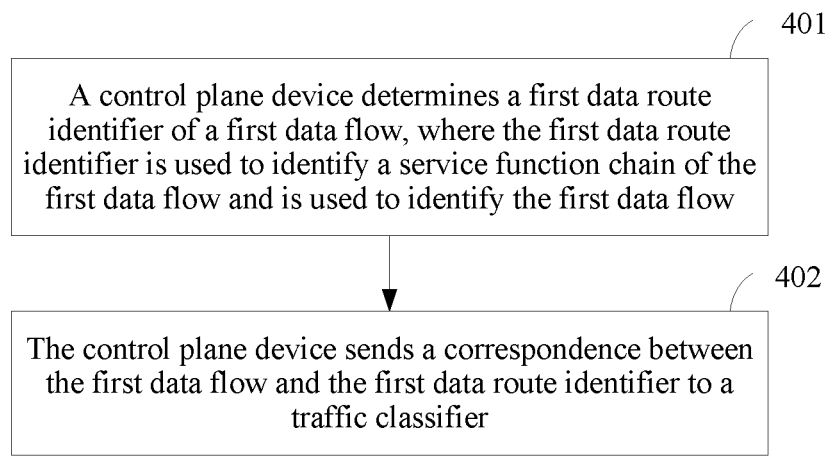
FIG. 4 is a flowchart of a data routing method according to a second embodiment of the present invention.

FIG. 4 is a flowchart of a data routing method according to a second embodiment of the present invention. As shown in FIG. 4, the method in this embodiment includes the following steps.

401. A control plane device determines a first data route identifier of a first data flow, where the first data route identifier is used to identify a service function chain of the first data flow and is used to identify the first data flow.

Optionally, the first data flow is corresponding to a service function chain identifier, the service function chain identifier is corresponding to multiple data route identifiers, and the service function chain identifier is used to identify the service function chain of the first data flow. The control plane device determines, according to a correspondence between the first data flow and the service function chain identifier and a correspondence between the service function chain identifier and the multiple data route identifiers, the multiple data route identifiers corresponding to the first data flow. The control plane device determines the first data route identifier from the multiple data route identifiers, and the first data route identifier is a data route identifier in the multiple data route identifiers that is not allocated to another data flow.

402. The control plane device sends a correspondence between the first data flow and the first data route identifier to a traffic classifier.

Optionally, the control plane device further determines a second data route identifier of a second data flow, the second data flow is a data flow in a direction opposite to the first data flow, and the second data route identifier is used to identify a service function chain of the second data flow and is used to identify the second data flow. The control plane device further sends a correspondence among the first data flow, the first data route identifier, and the second data route identifier to the traffic classifier.

A process of determining the second data route identifier of the second data flow is similar to a process of determining the first data route identifier of the first data flow. For details, refer to detailed descriptions in 401. The details are not described herein again.

The methods in the first embodiment and the second embodiment are described below by using examples and by using a specific application scenario.

Figure 5A:
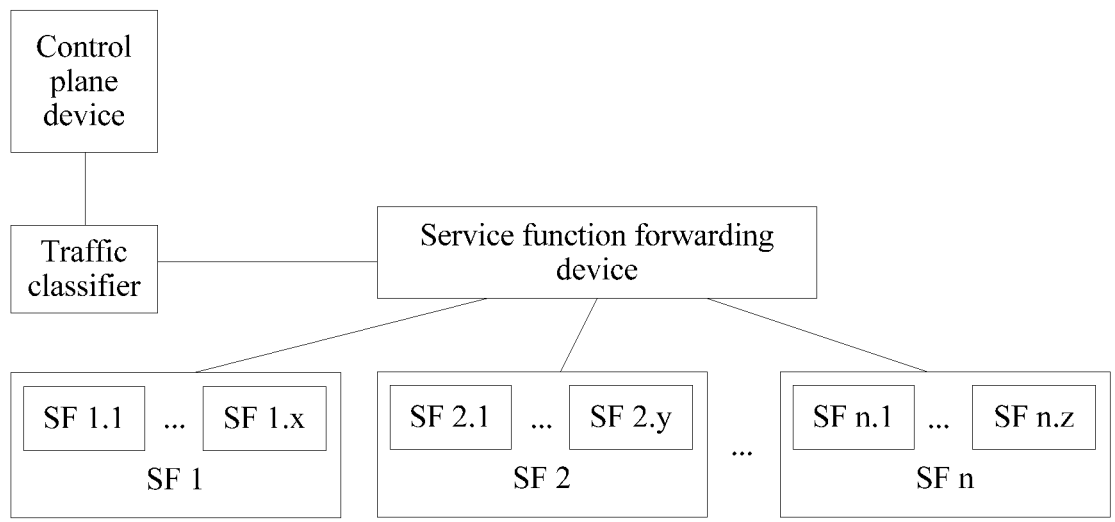
FIG. 5*a* is a schematic diagram of a data routing system according to a third embodiment of the present invention.

FIG. 5a is a schematic diagram of a data routing system according to a third embodiment. As shown in FIG. 5a, the system provided in this embodiment includes a control plane device, a traffic classifier, a service function forwarding device, and service function instances. An SF 1 to an SF n are corresponding to multiple service functions, and n is an integer greater than 2. In another embodiment, a quantity of service functions is not limited. A service function SF 2 is used as an example, and an SF 2.1 to an SF 2.y represent y service function instances of the service function SF 2. In FIG. 5a, x, y, and z are all integers greater than 1.

In actual application, the control plane device may configure a same service function chain for multiple types of data flows. For example, a same service function chain is used for data flows whose destination ports are 80. There are multiple types of data flows whose destination ports are 80, and each type of data flow has a different 5-tuple. That is, as shown in Table 1, multiple types of data flows may be corresponding to a same service function chain identifier.

TABLE 1

| Data flow | Service function chain identifier |
| --- | --- |
| 5-tuple 1 to 5-tuple N | a |
| 5-tuple N + 1 to 5-tuple M | b |
| 5-tuple M + 1 to 5-tuple L | c |
| ... | ... |

In this embodiment, the control plane device configures a correspondence between a service function chain identifier and a data route identifier according to a correspondence shown in Table 2, so that the service function forwarding device can perform load balancing when forwarding different data flows, to avoid a problem of low forwarding efficiency caused when a data flow is matched by using a 5-tuple and a service function instance sequence is determined.

TABLE 2

| Service function chain identifier | Data route identifier |
| --- | --- |
| a | 1 to N |
| b | N + 1 to M |
| c | M + 1 to L |
| ... | ... |

Optionally, the control plane device configures different data route identifiers for different data flows according to correspondences shown in Table 1 and Table 2. For example, a data flow with a service function chain identifier a is used as an example. A correspondence that is between a data flow and a data route identifier and that is obtained after the control plane device configures a data route identifier for the data flow is shown in Table 3. Certainly, the control plane device may configure different data route identifiers for different data flows according to another correspondence. This is not limited in this embodiment.

TABLE 3

| Data flow | Data route identifier |
| --- | --- |
| 5-tuple 1 | 1 |
| 5-tuple 2 | 2 |
| 5-tuple 3 | 3 |
| ... | ... |

Optionally, the control plane device further determines a data route identifier of a data flow in a direction opposite to the foregoing data flow, and performs configuration according to the correspondence shown in Table 3. A specific implementation is similar to a process of determining the data route identifier for the foregoing data flow, and details are not described herein again. For ease of description, the data flow in the direction opposite to the foregoing data flow may also be referred to as a reverse data flow.

Optionally, the control plane device further configures a correspondence among a data flow, a data route identifier of the data flow, and a data route identifier of a reverse data flow. In an example for description, any one of data flows with 5-tuples "a 5-tuple 1 to a 5-tuple N" is a first data flow. A data route identifier of the first data flow is referred to as a first data route identifier, a reverse data flow is referred to as a second data flow, and a data route identifier of the second data flow is referred to as a second data route identifier. A relationship among the first data flow, the first data route identifier, and the second data route identifier is shown in Table 4.

TABLE 4

| First data flow | First data route identifier | Second data route identifier |
| --- | --- | --- |
| 5-tuple 1 | 1 | X |
| 5-tuple 2 | 2 | Y |
| 5-tuple 3 | 3 | Z |
| ... | ... | ... |

The control plane device delivers a rule to the traffic classifier. The rule is a PCC rule or an ADC rule, and the rule includes the correspondence shown in Table 2 or Table 3. Optionally, the rule further includes the correspondence shown in Table 4.

After the traffic classifier receives the rule delivered by the control plane device, if the rule includes the correspondence shown in Table 2, the traffic classifier configures a correspondence shown in Table 5 according to the correspondence that is shown in Table 2 and that is between a service function chain identifier and multiple data route identifiers. After receiving a data flow, the traffic classifier searches Table 5 according to a service function chain identifier carried in the data flow, to determine a data route identifier of the data flow from multiple data route identifiers corresponding to the service function chain identifier. The data route identifier of the data flow is a data route identifier that is not allocated to another data flow. Then, the traffic classifier saves a correspondence between the data flow and the data route identifier, to obtain a correspondence that is shown in Table 6 and that is between a data flow and a data route identifier. For ease of description, the correspondence shown in Table 6 is consistent with the correspondence shown in Table 3.

TABLE 5

| Service function chain identifier | Data route identifier | Service function chain |
|---|---|---|
| a | 1 to N | SF 1->SF 2->SF 3 |
| b | N + 1 to M | SF 4->SF 6->SF 8 |
| c | M + 1 to L | SF 3->SF 5->SF 7 |
| ... | ... | ... |

TABLE 6

| Data flow | Data route identifier |
|---|---|
| 5-tuple 1 | 1 |
| 5-tuple 2 | 2 |
| 5-tuple 3 | 3 |
| ... | ... |

It should be noted that, the traffic classifier may allocate the data route identifier to the data flow in another manner (not by using Table 5). That is, after receiving the data flow, the traffic classifier allocates the data route identifier to the data flow, then establishes a correspondence between a service function chain identifier and a data route identifier, and establishes a correspondence between a data flow and a data route identifier, that is, creates Table 5 and Table 6.

If the rule delivered by the control plane device includes the correspondence shown in Table 3, the traffic classifier may configure the correspondence that is shown in Table 3 and that is between a data flow and a data route identifier. After receiving a data flow, the traffic classifier may directly determine, according to the correspondence shown in Table 3, a data route identifier corresponding to the data flow, and does not need to create Table 6.

Optionally, the traffic classifier further determines a data route identifier of a reverse data flow. A specific implementation is similar to a process in which the traffic classifier determines the data route identifier corresponding to the foregoing data flow. For example, if the rule delivered by the control plane device includes the correspondence shown in Table 2, the traffic classifier may allocate a data route identifier from data route identifiers corresponding to a service function chain identifier of a reverse data flow, to obtain the correspondence shown in Table 3. If the rule delivered by the control plane device includes the correspondence shown in Table 3, the traffic classifier may directly determine, according to the correspondence shown in Table 3, a data route identifier corresponding to a reverse data flow.

Optionally, if the rule delivered by the control plane device includes the correspondence shown in Table 4, after receiving a data flow, the traffic classifier may directly determine, according to the correspondence shown in Table 4, a data route identifier of a reverse data flow, that is, the second data route identifier shown in Table 4.

When receiving a data packet, the traffic classifier adds, to the data packet, a data route identifier corresponding to a data flow to which the data packet belongs. Optionally, the traffic classifier may further add, to the data packet, a data route identifier of a reverse data flow of a data flow to which the data packet belongs or indication information used for indicating a data route identifier of a reverse data flow.

A correspondence that is shown in Table 7 and that is between a data route identifier and a service function chain is configured in the service function forwarding device. When a data flow reaches the service function forwarding device, the service function forwarding device determines a corresponding service function chain according to a data route identifier of the data flow, performs load balancing according to a current network status, and selects service function instances for service functions in the service function chain, to determine and save a service function instance sequence corresponding to the data route identifier, so as to obtain a correspondence that is shown in Table 8 and that is between a data route identifier and a service function instance sequence.

TABLE 7

| Data route identifier | Service function chain |
|---|---|
| 1 to N | SF 1->SF 2->SF 3 |
| N + 1 to M | SF 4->SF 6->SF 8 |
| M + 1 to L | SF 3->SF 5->SF 7 |

TABLE 8

| Data route identifier | Service function instance sequence |
|---|---|
| 1 | SF 1.1->SF 2.1->SF 3.1 |
| 2 | SF 1.1->SF 2.2->SF 3.2 |
| ... | ... |

Optionally, the service function forwarding device further queries Table 7 according to a data route identifier of a reverse data flow, to obtain a service function chain corresponding to the reverse data flow, performs load balancing according to a current network status, and selects service function instances for service functions in the service function chain. Alternatively, the service function forwarding device further determines a service function instance sequence of a reverse data flow according to Table 8. For a service function included in both a service function chain of a data flow and a service function chain of a reverse data flow, the service function forwarding device selects a same service function instance.

When receiving a data packet, the service function forwarding device forwards the data packet according to a service function instance sequence corresponding to a data flow to which the data packet belongs.

Operations performed after the traffic classifier receives a data packet that belongs to a first data flow are used as an example below for description.

(1) The traffic classifier searches Table 6 according to a 5-tuple of the first data flow to which the data packet belongs, and determines whether there is a first data route identifier corresponding to the 5-tuple in Table 6.

(2) If there is the first data route identifier corresponding to the 5-tuple of the first data flow to which the data packet belongs in Table 6, the traffic classifier adds the first data route identifier to the data packet. Otherwise, the traffic classifier allocates the corresponding first data route identifier according to the 5-tuple, such as allocates the first data route identifier by using Table 5 or at random; then adds the allocated first data route identifier to the data packet, and saves a correspondence between the 5-tuple and the allocated first data route identifier in Table 6.

(3) The traffic classifier determines a 5-tuple of a second data flow, and the second data flow is a data flow in a direction opposite to the first data flow. The traffic classifier determines whether there is a second data route identifier corresponding to the 5-tuple of the second data flow in Table 6. If there is the second data route identifier corresponding to the 5-tuple of the second data flow in Table 6, the traffic classifier adds the second data route identifier or indication information to the data packet, and the indication information is used to indicate the second data route identifier. For example, an indication value of the second data route identifier may be carried in a most significant bit or a least significant bit of the data packet, or it is stipulated that indication may be performed in a manner in which the first data route identifier, the second data route identifier, and the indication information of the second data route identifier meet a mathematical relationship.

(4) The traffic classifier sends the data packet to the service function forwarding device.

(5) After receiving the data packet, the service function forwarding device may search Table 7 according to the first data route identifier, determine a service function chain corresponding to the first data route identifier, and determine a corresponding service function instance sequence according to the service function chain; or the service function forwarding device may search Table 8 according to the first data route identifier, and directly determine a corresponding service function instance sequence.

(6) The service function forwarding device searches Table 7 according to the second data route identifier, determines a service function instance sequence corresponding to the second data route identifier, and when a service function chain corresponding to the second data route identifier and the service function chain corresponding to the first data route identifier include a same service function, selects a same service function instance for the same service function.

(7) The service function forwarding device forwards the data packet according to the determined service function instance sequence.

Figure 5B:
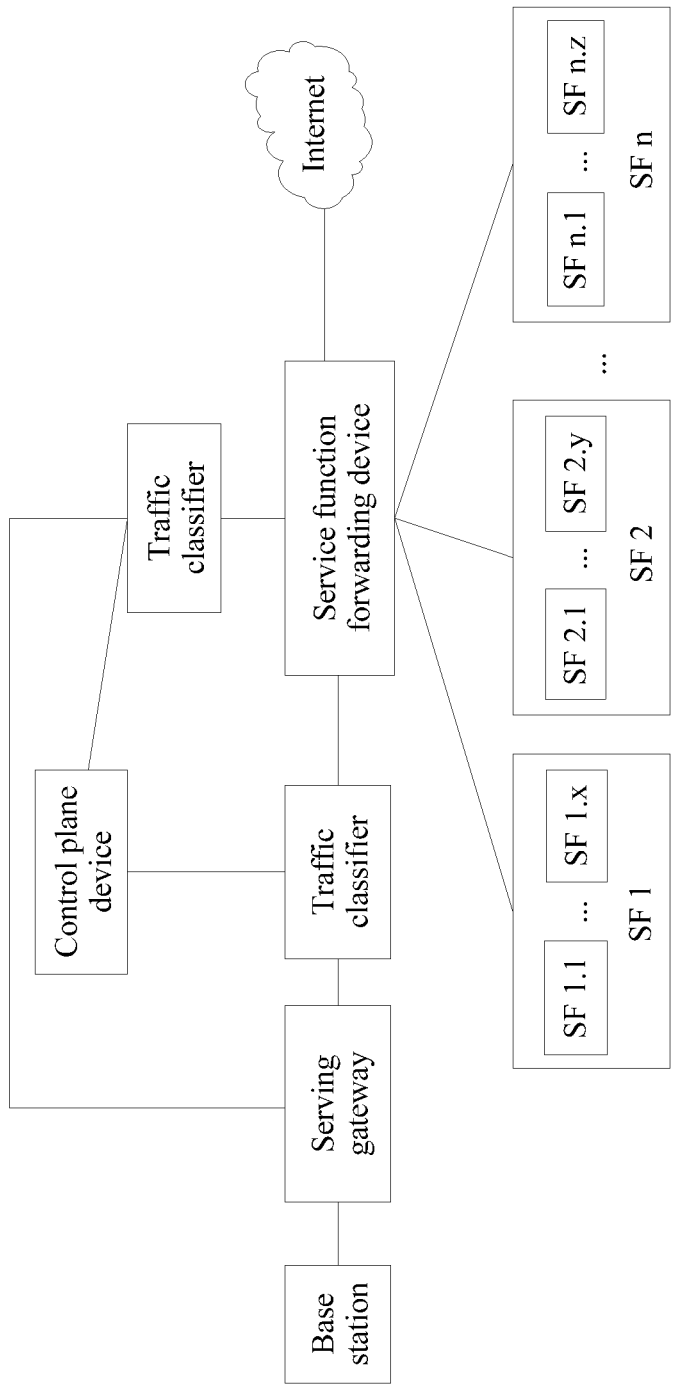
FIG. 5*b* is a schematic diagram of a data routing system according to a fourth embodiment of the present invention.

It should be noted that the implementation in the third embodiment is also applicable to a system shown in FIG. 5b. FIG. 5b is a schematic diagram of a data routing system according to a fourth embodiment. As shown in FIG. 5b, the system in this embodiment includes a control plane device, two traffic classifiers, a service function forwarding device, and a service function instance. In the two traffic classifiers, one traffic classifier processes only an uplink data flow that is from a base station to the Internet, and the other traffic classifier processes only a downlink data flow that is from the Internet to the base station. A difference between this embodiment and the third embodiment is that after determining the correspondence shown in Table 3, the control plane device configures the correspondence for each traffic classifier, or after determining the correspondence shown in Table 4, the control plane device configures the correspondence for each traffic classifier. For other content, refer to detailed descriptions in the third embodiment. Details are not described herein again.

Figure 6:
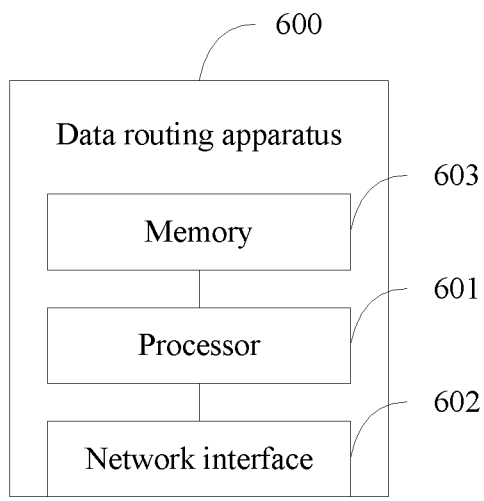
FIG. 6 is a schematic structural diagram of a data routing apparatus according to a fifth embodiment of the present invention.

FIG. 6 is a schematic structural diagram of a data routing apparatus according to a fifth embodiment of the present invention. In this embodiment, for content corresponding to the first embodiment, refer to detailed descriptions in the first embodiment. Details are not described herein again. The apparatus provided in this embodiment may be a traffic classifier. The traffic classifier may be an independent device, or may be integrated into a network device such as a PGW, a PCRF entity, or a TDF entity. As shown in FIG. 6, an apparatus 600 in this embodiment includes a processor 601 and a network interface 602.

The network interface 602 is configured to receive a data packet, and the data packet belongs to a first data flow.

The processor 601 is configured to: allocate a first data route identifier to the first data flow, where the first data route identifier is used to identify a service function chain of the first data flow and is used to identify the first data flow; and add the first data route identifier to the data packet.

The network interface 602 is further configured to send the data packet to a service function forwarding device.

Optionally, the processor 601 is configured to allocate the first data route identifier to the first data flow in one of the several manners in 302 of the first embodiment.

Manner 1: After the network interface 602 receives the data packet that includes a first service function chain identifier of the first data flow, the processor 601 is configured to: obtain a correspondence between the first service function chain identifier and multiple data route identifiers, and allocate the first data route identifier to the first data flow from the multiple data route identifiers according to the correspondence between the first service function chain identifier and the multiple data route identifiers. The allocated first data route identifier is a data route identifier in the multiple data route identifiers that is not allocated to another data flow.

Manner 2: The processor 601 is configured to allocate the first data route identifier to the first data flow according to a correspondence between the first data flow and the first data route identifier. The correspondence between the first data flow and the first data route identifier is sent by a control plane device to the traffic classifier.

Manner 3: The processor 601 is configured to randomly allocate the first data route identifier to the first data flow.

Optionally, in Manner 1 and Manner 3, after allocating the first data route identifier to the first data flow, the processor 601 is further configured to establish the correspondence between the first data flow and the first data route identifier, so that the processor 601 directly queries the correspondence after the network interface 602 subsequently receives the data packet that belongs to the first data flow. For example, the processor 601 is configured to establish a correspondence between a 5-tuple of the first data flow and the first data route identifier.

Optionally, before the network interface 602 sends the data packet to the service function forwarding device, the processor 601 is further configured to: determine a second data route identifier of a second data flow, where the second data flow is a data flow in a direction opposite to the first data flow, and the second data route identifier is used to identify a service function chain of the second data flow and is used to identify the second data flow; and add indication information to the data packet, where the indication information is used to indicate the second data route identifier.

Optionally, the processor 601 is configured to determine the second data route identifier of the second data flow in one of the two manners in 304 of the first embodiment.

Manner 1: The processor 601 is configured to: determine a second service function chain identifier of the second data flow, and allocate the second data route identifier to the second data flow according to the second service function chain identifier. The second service function chain identifier is used to identify the service function chain of the second data flow.

Manner 2: The processor 601 is configured to determine the second data route identifier according to a correspondence between the second data flow and the second data route identifier. The second data route identifier is allocated to the second data flow when the apparatus 600 receives the second data flow. Optionally, the processor 601 is further configured to: search a stored correspondence between a data flow and a data route identifier; and if there is the second data route identifier of the second data flow in the correspondence, directly obtain the second data route identifier of the second data flow from the correspondence; or if there is no second data route identifier of the second data flow in the correspondence, allocate the second data route identifier to the second data flow according to the second service function chain identifier of the second data flow, and save the correspondence between the second data flow and the second data route identifier. A process in which the processor 601 allocates the second data route identifier to the second data flow according to the second service function chain identifier of the second data flow is similar to a process in which the processor 601 allocates the first data route identifier to the first data flow according to the first service function chain identifier of the first data flow. Details are not described herein again.

Optionally, the network interface 602 is configured to perform a signal receiving process and a signal sending process of the traffic classifier in the method shown in FIG. 3. The processor 601 is configured to perform a signal processing process of the traffic classifier in the method shown in FIG. 3. Further, the apparatus 600 may further include a memory 603. The memory 603 is configured to store a processor-executable instruction. By using the instruction stored in the memory 603, the processor 601 may perform the signal processing process of the traffic classifier in the method shown in FIG. 3. For example:

By using the processor-executable instruction stored in the memory 603, the processor 601 may perform the following operations: receiving a data packet, where the data packet belongs to a first data flow; allocating a first data route identifier to the first data flow, where the first data route identifier is used to identify a service function chain of the first data flow and is used to identify the first data flow; adding, by the traffic classifier, the first data route identifier to the data packet; and sending, by the traffic classifier, the data packet to a service function forwarding device.

Optionally, an embodiment of the present invention further provides a computer storage medium or a computer program product, configured to store the processor-executable instruction stored in the memory 603.

Optionally, the memory 603 may be a storage unit, and the processor 601 may be a processing unit.

Figure 7:
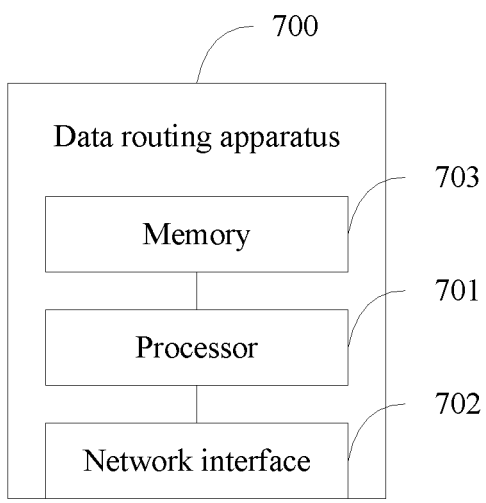
FIG. 7 is a schematic structural diagram of a data routing apparatus according to a sixth embodiment of the present invention.

FIG. 7 is a schematic structural diagram of a data routing apparatus according to a sixth embodiment of the present invention. In this embodiment, for content corresponding to the first embodiment, refer to detailed descriptions in the first embodiment. Details are not described herein again. The apparatus provided in this embodiment may be a service function forwarding device. As shown in FIG. 7, an apparatus 700 in this embodiment includes a processor 701 and a network interface 702.

The network interface 702 is configured to receive a data packet. The data packet includes a first data route identifier of a first data flow to which the data packet belongs, and the first data route identifier is used to identify a service function chain of the first data flow and is used to identify the first data flow.

The processor 701 is configured to: determine the service function chain of the first data flow according to the first data route identifier, and determine a service function instance sequence of the first data flow according to the service function chain.

The network interface 702 is further configured to forward the data packet according to the service function instance sequence.

Optionally, the apparatus 700 in this embodiment locally stores a correspondence among the first service function chain identifier, the first data route identifier, and the service function chain. The correspondence may be configured by a control plane device for the apparatus 700, or may be forwarded by another function device to the apparatus 700.

Optionally, the processor 701 is configured to: determine a service function chain identified by the first data route identifier, and sequentially select corresponding service function instances for service functions in the service function chain according to a function of identifying the first data flow by the first data route identifier and according to order of the service functions in the service function chain. The selected service function instances form the service function instance sequence of the first data flow.

Optionally, the processor 701 is further configured to: store a correspondence between the first data route identifier and the service function instance sequence of the first data flow, so that the processor 701 directly searches, after the network interface 702 subsequently receives the data packet that belongs the first data flow, the correspondence according to the first data route identifier carried in the data packet; and obtain a service function instance sequence corresponding to the first data route identifier. In this way, a corresponding service function instance sequence is not retrieved according to a 5-tuple in the data packet each time, and data forwarding efficiency is improved.

Optionally, the processor 701 is further configured to: determine a second data route identifier according to indication information included in the data packet, determine a service function chain of a second data flow according to the second data route identifier, and determine a service function instance sequence of the second data flow according to the service function chain of the second data flow. The processor 701 is configured to: when the service function chain of the second data flow and the service function chain of the first data flow include a same service function, select a same service function instance for the same service function. That is, in a process of selecting service function instances for service functions in the service function chain of the first data flow, for a service function included in both the service function chain of the first data flow and the service function chain of the second data flow, the processor 701 selects a same service function instance as a service function instance of a same service function of the second data flow, to avoid routing interruption of the data flow.

Optionally, the network interface 702 is configured to perform a signal receiving process and a signal sending process of the service function forwarding device in the method shown in FIG. 3. The processor 701 is configured to perform a signal processing process of the service function forwarding device in the method shown in FIG. 3.

Further, the apparatus 700 may further include a memory 703. The memory 703 is configured to store a processor-executable instruction. By using the instruction stored in the memory 703, the processor 701 may perform the signal processing process of the service function forwarding device in the method shown in FIG. 3. For example:

By using the processor-executable instruction stored in the memory 703, the processor 701 may perform the following operations: receiving a data packet, where the data packet includes a first data route identifier of a first data flow to which the data packet belongs, and the first data route identifier is used to identify a service function chain of the first data flow and is used to identify the first data flow; determining the service function chain of the first data flow according to the first data route identifier, and determining a service function instance sequence of the first data flow according to the service function chain; and forwarding the data packet according to the service function instance sequence.

Optionally, an embodiment of the present invention further provides a computer storage medium or a computer program product, configured to store the processor-executable instruction stored in the memory 703.

Optionally, the memory 703 may be a storage unit, and the processor 701 may be a processing unit.

Figure 8:
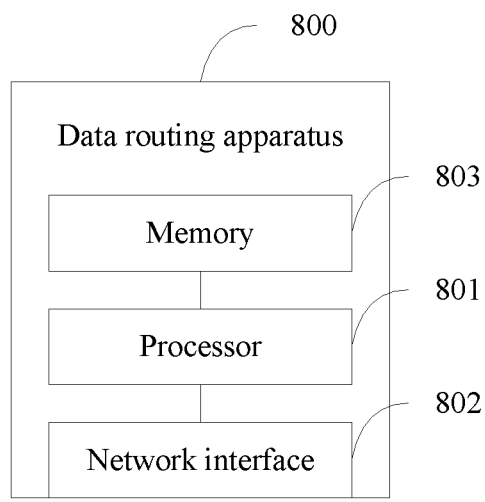
FIG. 8 is a schematic structural diagram of a data routing apparatus according to a seventh embodiment of the present invention.

FIG. 8 is a schematic structural diagram of a data routing apparatus according to a seventh embodiment of the present invention. In this embodiment, for content corresponding to the second embodiment, refer to detailed descriptions in the second embodiment. Details are not described herein again. The apparatus in this embodiment may be a control plane device. As shown in FIG. 8, an apparatus 800 in this embodiment includes a processor 801 and a network interface 802.

The processor 801 is configured to determine a first data route identifier of a first data flow. The first data route identifier is used to identify a service function chain of the first data flow and is used to identify the first data flow.

The network interface 802 is configured to send a correspondence between the first data flow and the first data route identifier to a traffic classifier.

Optionally, the first data flow is corresponding to a service function chain identifier, the service function chain identifier is corresponding to multiple data route identifiers, and the service function chain identifier is used to identify the service function chain of the first data flow. The processor 801 is configured to: determine the multiple data route identifiers according to a correspondence between the first data flow and the service function chain identifier and a correspondence between the service function chain identifier and the multiple data route identifiers; and determine the first data route identifier from the multiple data route identifiers. The first data route identifier is a data route identifier that is not allocated to another data flow.

Optionally, the processor 801 is further configured to determine a second data route identifier of a second data flow. The second data flow is a data flow in a direction opposite to the first data flow, and the second data route identifier is used to identify a service function chain of the second data flow and is used to identify the second data flow. After the processor 801 determines the second data route identifier of the second data flow, the network interface 802 is further configured to send a correspondence among the first data flow, the first data route identifier, and the second data route identifier to the traffic classifier.

A process in which the processor 801 determines the second data route identifier of the second data flow is similar to a process in which the processor 801 determines the first data route identifier of the first data flow. Details are not described herein again.

Optionally, the network interface 802 is configured to perform a signal receiving process and a signal sending process in the method shown in FIG. 4. The processor 801 is configured to perform a signal processing process in the method shown in FIG. 4.

Further, the apparatus 800 may further include a memory 803. The memory 803 is configured to store a processor-executable instruction. By using the instruction stored in the memory 803, the processor 801 may perform the signal processing process in the method shown in FIG. 4. For example:

By using the processor-executable instruction stored in the memory 803, the processor 801 may perform the following operations: determining a first data route identifier of a first data flow, where the first data route identifier is used to identify a service function chain of the first data flow and is used to identify the first data flow; and sending a correspondence between the first data flow and the first data route identifier to a traffic classifier.

Optionally, an embodiment of the present invention further provides a computer storage medium or a computer program product, configured to store the processor-executable instruction stored in the memory 803.

Optionally, the memory 803 may be a storage unit, and the processor 801 may be a processing unit.

Figure 9:
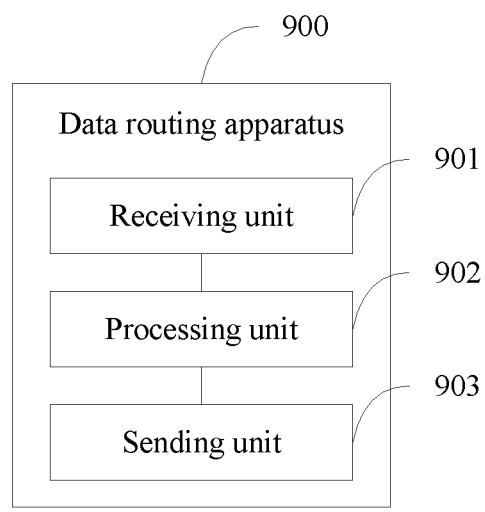
FIG. 9 is a schematic structural diagram of a data routing apparatus according to an eighth embodiment of the present invention.

FIG. 9 is a schematic structural diagram of a data routing apparatus according to an eighth embodiment of the present invention. In this embodiment, for content corresponding to the first embodiment, refer to detailed descriptions in the first embodiment, and for content similar to that in the fifth embodiment, refer to detailed descriptions in the fifth embodiment. Details are not described herein again. As shown in FIG. 9, an apparatus 900 in this embodiment includes a receiving unit 901, a processing unit 902, and a sending unit 903.

The receiving unit 901 is configured to receive a data packet, and the data packet belongs to a first data flow.

The processing unit 902 is configured to: allocate a first data route identifier to the first data flow, where the first data route identifier is used to identify a service function chain of the first data flow and is used to identify the first data flow; and add the first data route identifier to the data packet.

The sending 903 is further configured to send the data packet to a service function forwarding device.

Optionally, the data packet includes a first service function chain identifier of the first data flow, the first service function chain identifier is used to identify the service function chain of the first data flow, and the processing unit 902 is configured to allocate the first data route identifier to the first data flow according to the first service function chain identifier.

Optionally, the processing unit 902 is configured to allocate the first data route identifier to the first data flow according to a correspondence between the first data flow and the first data route identifier. The correspondence between the first data flow and the first data route identifier is sent by a control plane device to the apparatus 900.

Optionally, before the sending unit 903 sends the data packet to the service function forwarding device, the processing unit 902 is further configured to: determine a second data route identifier of a second data flow, where the second data flow is a data flow in a direction opposite to the first data flow, and the second data route identifier is used to identify a service function chain of the second data flow and is used to identify the second data flow; and add indication information to the data packet, where the indication information is used to indicate the second data route identifier.

Optionally, the processing unit 902 is configured to: determine a second service function chain identifier of the second data flow, and allocate the second data route identifier to the second data flow according to the second service function chain identifier. The second service function chain identifier is used to identify the service function chain of the second data flow. Alternatively, the processing unit 902 is configured to determine the second data route identifier according to a correspondence between the second data flow and the second data route identifier, and the second data route identifier is allocated when the apparatus 900 receives the second data flow.

Figure 10:
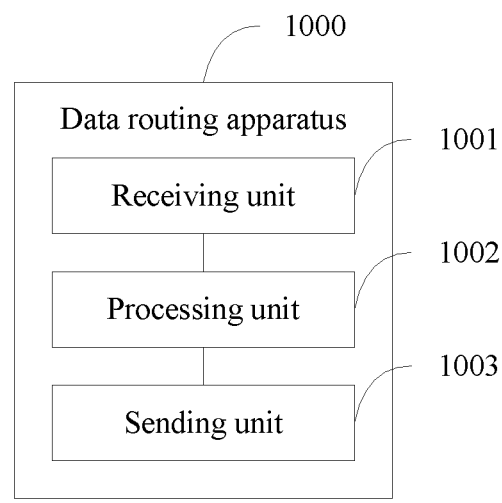
FIG. 10 is a schematic structural diagram of a data routing apparatus according to a ninth embodiment of the present invention.

FIG. 10 is a schematic structural diagram of a data routing apparatus according to a ninth embodiment of the present invention. In this embodiment, for content corresponding to the first embodiment, refer to detailed descriptions in the first embodiment, and for content similar to that in the sixth embodiment, refer to detailed descriptions in the sixth embodiment. Details are not described herein again. The apparatus provided in this embodiment may be a service function forwarding device. As shown in FIG. 10, an apparatus 1000 in this embodiment includes a receiving unit 1001, a processing unit 1002, and a sending unit 1003.

The receiving unit 1001 is configured to receive a data packet. The data packet includes a first data route identifier of a first data flow to which the data packet belongs, and the first data route identifier is used to identify a service function chain of the first data flow and is used to identify the first data flow.

The processing unit 1002 is configured to: determine the service function chain of the first data flow according to the first data route identifier, and determine a service function instance sequence of the first data flow according to the service function chain.

The sending unit 1003 is further configured to forward the data packet according to the service function instance sequence.

Optionally, the data packet further includes indication information, the indication information is used to indicate a second data route identifier of a second data flow, the second data flow is a data flow in a direction opposite to the first data flow, and the second data route identifier is used to identify a service function chain of the second data flow and is used to identify the second data flow. The processing unit 1002 is further configured to: determine the second data route identifier according to the indication information, determine the service function chain of the second data flow according to the second data route identifier, and determine a service function instance sequence of the second data flow according to the service function chain of the second data flow. The processing unit 1002 is configured to: when the service function chain of the second data flow and the service function chain of the first data flow include a same service function, select a same service function instance for the same service function.

Figure 11:
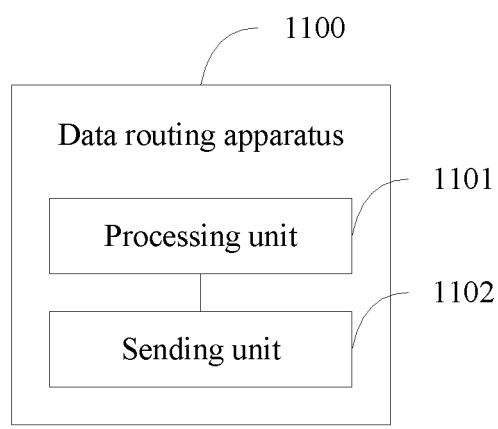
FIG. 11 is a schematic structural diagram of a data routing apparatus according to a tenth embodiment of the present invention.

FIG. 11 is a schematic structural diagram of a data routing apparatus according to a tenth embodiment of the present invention. In this embodiment, for content corresponding to the second embodiment, refer to detailed descriptions in the second embodiment, and for content similar to that in the seventh embodiment, refer to detailed descriptions in the seventh embodiment. Details are not described herein again. The apparatus provided in this embodiment may be a control plane device. As shown in FIG. 11, an apparatus 1100 in this embodiment includes a processing unit 1101 and a sending unit 1102.

The processing unit 1101 is configured to determine a first data route identifier of a first data flow. The first data route identifier is used to identify a service function chain of the first data flow and is used to identify the first data flow.

The sending unit 1102 is configured to send a correspondence between the first data flow and the first data route identifier to a traffic classifier.

Optionally, the first data flow is corresponding to a service function chain identifier, the service function chain identifier is corresponding to multiple data route identifiers, and the service function chain identifier is used to identify the service function chain of the first data flow. The processing unit 1101 is configured to: determine, according to a correspondence between the first data flow and the service function chain identifier and a correspondence between the service function chain identifier and the multiple data route identifiers, the multiple data route identifiers corresponding to the first data flow; and determine the first data route identifier from the multiple data route identifiers. The first data route identifier is a data route identifier that is not allocated to another data flow.

Optionally, the processing unit 1101 is further configured to determine a second data route identifier of a second data flow. The second data flow is a data flow in a direction opposite to the first data flow, and the second data route identifier is used to identify a service function chain of the second data flow and is used to identify the second data flow.

Optionally, the sending unit 1102 is further configured to send a correspondence among the first data flow, the first data route identifier, and the second data route identifier to the traffic classifier.

Based on the foregoing technical solutions, in the embodiments of the present invention, the traffic classifier adds, to a data packet, a data route identifier of a data flow to which the data packet belongs, and after receiving the data packet, the service function forwarding device determines a service function instance sequence according to the data route identifier in the data packet. Therefore, matching is not performed by using a 5-tuple, and data packet forwarding efficiency is improved.

Further, indication information of a data route identifier of a reverse data flow is added to the data packet, and the service function forwarding device performs matching according to the data route identifier of the reverse data flow of the data flow to which the data packet belongs, to determine a service function instance sequence of the reverse data flow. Therefore, when determining the service function instance sequence of the data flow to which the data packet belongs, the service function forwarding device may directly refer to the service function instance sequence of the reverse data flow, so that a process of determining a 5-tuple of the reverse data flow according to a 5-tuple of the data flow and then matching the service function instance sequence of the reverse data flow by using the 5-tuple of the reverse data flow is avoided, and the data forwarding efficiency is further improved.

Persons skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a magnetic disk storage, an optical storage, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that an apparatus for implementing a specific function in one or more processes in the flowcharts and/or in one or more blocks in the block diagrams is generated by using the instructions executed by the computer or the processor of the another programmable data processing device.

These computer program instructions may be stored in a computer readable memory that can instruct the computer or the another programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, persons skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. A data routing method, comprising:
   receiving, by a traffic classifier, a data packet of a first data flow;
   allocating, by the traffic classifier, a first data route identifier to the first data flow, wherein the first data route identifier is used to identify a service function chain of the first data flow and is used to identify the first data flow;
   adding, by the traffic classifier, the first data route identifier to the data packet;
   determining, by the traffic classifier, a second data route identifier of a second data flow, wherein the second data flow is a data flow in a direction opposite to the first data flow, and the second data route identifier is used to identify a service function chain of the second data flow and is used to identify the second data flow; and
   adding, by the traffic classifier, indication information to the data packet, wherein the indication information is used to indicate the second data route identifier; and
   sending, by the traffic classifier, the data packet to a service function forwarding device, wherein the determining, by the traffic classifier, a second data route identifier of a second data flow comprises:
   determining, by the traffic classifier, a second service function chain identifier of the second data flow, and allocating the second data route identifier to the second data flow according to the second service function chain identifier, wherein the second service function chain identifier is used to identify the service function chain of the second data flow; or
   determining, by the traffic classifier, the second data route identifier according to a correspondence between the second data flow and the second data route identifier, wherein the second data route identifier is allocated when the traffic classifier receives the second data flow.

2. The method according to claim 1, wherein the data packet comprises a first service function chain identifier of the first data flow, the first service function chain identifier is used to identify the service function chain of the first data flow, and the allocating, by the traffic classifier, a first data route identifier to the first data flow comprises:
   allocating, by the traffic classifier, the first data route identifier to the first data flow according to the first service function chain identifier.

3. The method according to claim 1, wherein the allocating, by the traffic classifier, a first data route identifier to the first data flow comprises:
   allocating, by the traffic classifier, the first data route identifier to the first data flow according to a correspondence between the first data flow and the first data route identifier, wherein the correspondence between the first data flow and the first data route identifier is sent by a control plane device to the traffic classifier.

4. A data routing apparatus, comprising:
   a network interface configured to receive a data packet of a first data flow; and
   a processor configured to: allocate a first data route identifier to the first data flow, wherein the first data route identifier is used to identify a service function chain of the first data flow and is used to identify the first data flow; and add the first data route identifier to the data packet;
   determine a second data route identifier of a second data flow, wherein the second data flow is a data flow in a direction opposite to the first data flow, and the second data route identifier is used to identify a service function chain of the second data flow and is used to identify the second data flow; and add indication information to the data packet, wherein the indication information is used to indicate the second data route identifier, wherein
   the network interface is further configured to send the data packet to a service function forwarding device, wherein:
   the processor is configured to: determine a second service function chain identifier of the second data flow, and allocate the second data route identifier to the second data flow according to the second service function chain identifier, wherein the second service function chain identifier is used to identify the service function chain of the second data flow; or
   the processor is configured to determine the second data route identifier according to a correspondence between the second data flow and the second data route identifier, wherein the second data route identifier is allocated when the traffic classifier receives the second data flow.

5. The apparatus according to claim 4, wherein the data packet comprises a first service function chain identifier of the first data flow, the first service function chain identifier is used to identify the service function chain of the first data flow, and the processor is configured to allocate the first data route identifier to the first data flow according to the first service function chain identifier.

6. The apparatus according to claim 4, wherein the processor is configured to allocate the first data route identifier to the first data flow according to a correspondence between the first data flow and the first data route identifier, wherein the correspondence between the first data flow and the first data route identifier is sent by a control plane device to the apparatus.

* * * * *